Fig.I.

Patented Jan. 9, 1923.

1,441,426

UNITED STATES PATENT OFFICE.

WILLIAM KAISLING, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

ELECTRICAL RECTIFIER AND POLE CHANGER.

Application filed April 12, 1918. Serial No. 228,085.

*To all whom it may concern:*

Be it known that I, WILLIAM KAISLING, a citizen of the United States of America, and resident of Chicago, county of Cook, and State of Illinois, have invented certain new and useful Improvements in Electrical Rectifiers and Pole Changers, of which the following is a specification.

My invention relates to current rectifiers and pole changers, and has to do more particularly with a device of the character described for use in automatically rectifying alternating current of a given frequency into uni-directional current and for then changing the said uni-directional current back into alternating current of a frequency different than the frequency of the original current, for use in operating bells or ringers of a telephone system.
Various forms of current rectifiers or converters, such as mechanical, including both the vibrating and the rotary type, electrolytic, chemical, mercury arc, tungar, etc., have been used for rectifying alternating current into uni-directional current for use in operating diversified forms of mechanical and electromagnetic devices, likewise, diversified forms of pole changers, including both rotary and vibratory changers, have been used for changing the current supplied from the rectifier into alternating current for use in operating the bells or ringers of a telephone system and other mechanical devices.

In many telephone exchange systems, the rectifier and pole changer are permanently associated with each other and are connected directly to a supply source such as an alternating current lighting circuit. The ringing current supplied by the pole changer is then connected to the ringing apparatus and is used for operating the call bells of the substation telephone sets. Owing to the fact that the source of supply current of the lighting circuit often is shut off for an appreciable length of time, thereby rendering the combined rectifier and pole changer outfit of no avail for use for signaling purposes, in small exchanges the operator is compelled to use a hand magneto or generator for operating the call bell of the called subscribers, while in larger sized exchanges, other means is provided for furnishing current for ringing purposes.

The above difficulty arises very often where the main supply of alternating current to the telephone exchange comes from some little distance, and distributed along this line somewhere may be located various motors or other devices that take a great deal of current for short periods of operation, and thereby cut down the supply that is furnished to the telephone exchange for certain periods of time. The cutting down of the current supplied to the telephone exchange necessarily causes a drop in the voltage and this tends to cause an improper operation, if not the cessation of operation entirely, of the current rectifier and pole changer in use.

An object of my invention is to overcome the above difficulty. To do this, I have so arranged my combined rectifier and pole changer that the pole changer may be operatively disassociated from the rectifier and immediately connected to a source of uni-directional current such as that supplied by a storage battery or a set of dry cells. By this arrangement, I am able to operate the pole changer from the storage battery or a set of dry cells for the required periods of time that the rectifier is out of service. The time that the pole changer is operated off the set of dry cells ordinarily will not be of a long enough period to discharge the said dry cells to a great extent.

Another object of my invention is the provision of an improved device of the character described, provided with an improved circuit arrangement supplemented by a correct proportion of the impedances, resistances, and capacities to provide a highly efficient circuit to accomplish the desired results.

The above mentioned features of my invention, as well as others, will be hereinafter more particularly pointed out in the ensuing specification and in the appended claims.

For a better understanding of my invention, reference may be had to the accompanying drawings, in which:

Figure 1:
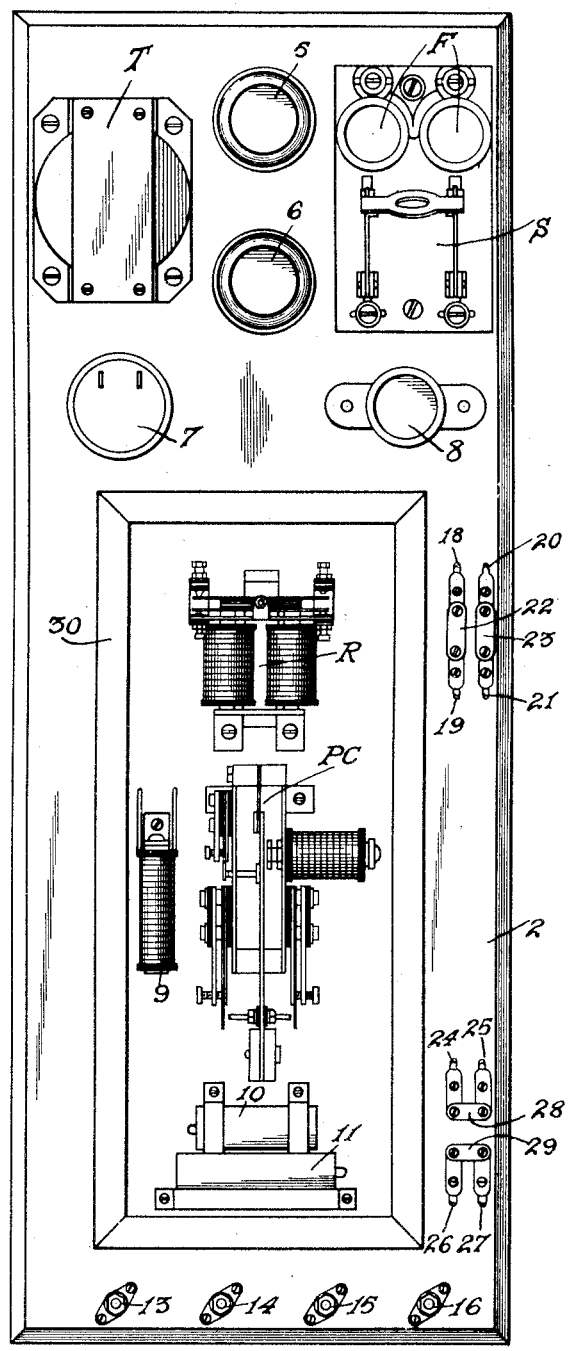
Fig. 1 is a plan view of the electrical rectifier and pole changer of my invention and its auxiliary apparatus.

Referring now more particularly to Fig. 1, I have illustrated the mechanical devices used in my combined electrical rectifier and pole changer. Upon the mounting board 2 which carries the apparatus is a double-pole-single-throw switch S, for connecting and disconnecting the apparatus and the source of alternating current which is connected to the conductors A. A pair of fuses F are provided for protecting the apparatus connected to the source of current. A pair of lamp sockets 5 and 6 is also provided, which lamp sockets are adapted to receive resistance lamps which are connected in circuit with the apparatus for purposes as will be hereinafter more fully described. A transformer T is mounted upon the board by means of suitable screws and has its primary winding connected across the source of alternating current, and its secondary winding connected to the apparatus. From inspection of the circuit arrangements, it is at once seen that all of the apparatus of my combined device is inductively associated with the source of current supply through the medium of the transformer, and not conductively connected thereto as in previously used systems. It is often found that the voltage of the supply source of current A varies considerably owing to the fact that there may be machines or other devices consuming a large amount of current connected to the conductors A and these devices when they are thrown into circuit cause the voltage of the current delivered through the switch S to widely vary. The changing in the voltage of the supply source of current often causes an improper operation of the rectifier relay and of the pole changer. To overcome this difficulty I have placed a transformer between the supply source of current, and the rectifier relay and pole changer. This transformer is so wound and arranged that the voltage of the source A may vary to a great extent without causing an improper operation of the rectifier R and the pole changer PC. There are various other advantages of having all of the inside connections on the secondary winding of the transformer. A condenser 7 and a resistance 8 are suitably mounted upon the board and are operatively associated with the pole changer PC. A rectifier relay R is suitably mounted upon the board by means of screws and operates to rectify the alternating current taken from the supply mains into uni-directional current. A pole changer PC is also suitably mounted upon the board 2 and changes the rectified or uni-directional current received from the rectifier relay R back into alternating current of a different frequency than the supply current, for ringing bells or operating other electromechanical devices. A resistance 9 is also suitably mounted upon the board 2 and is operatively associated with the pole changer magnet for purposes as will be more fully hereinafter described.

Figure 2:
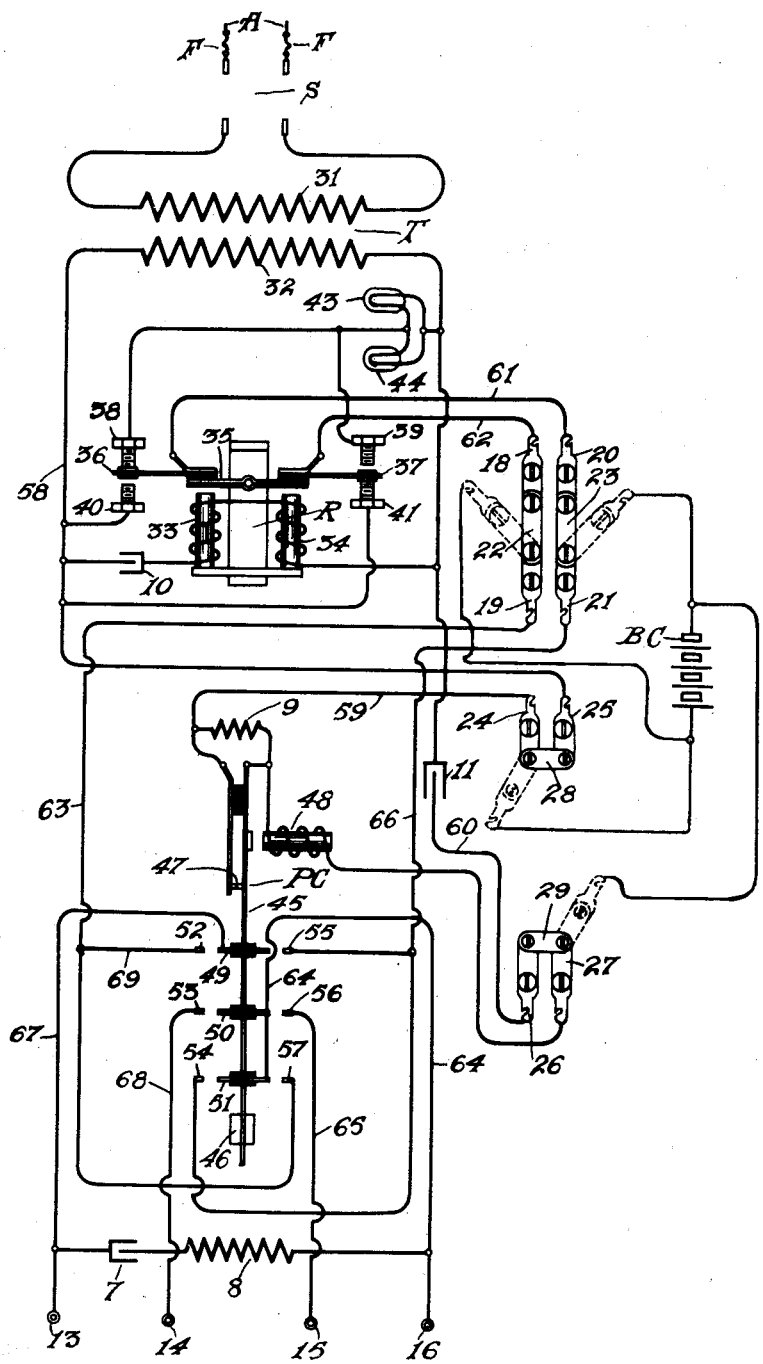
Fig. 2 is a diagrammatic circuit illustration of the electrical rectifier and pole changer for delivering alternating and pulsating currents.
Figure 3:
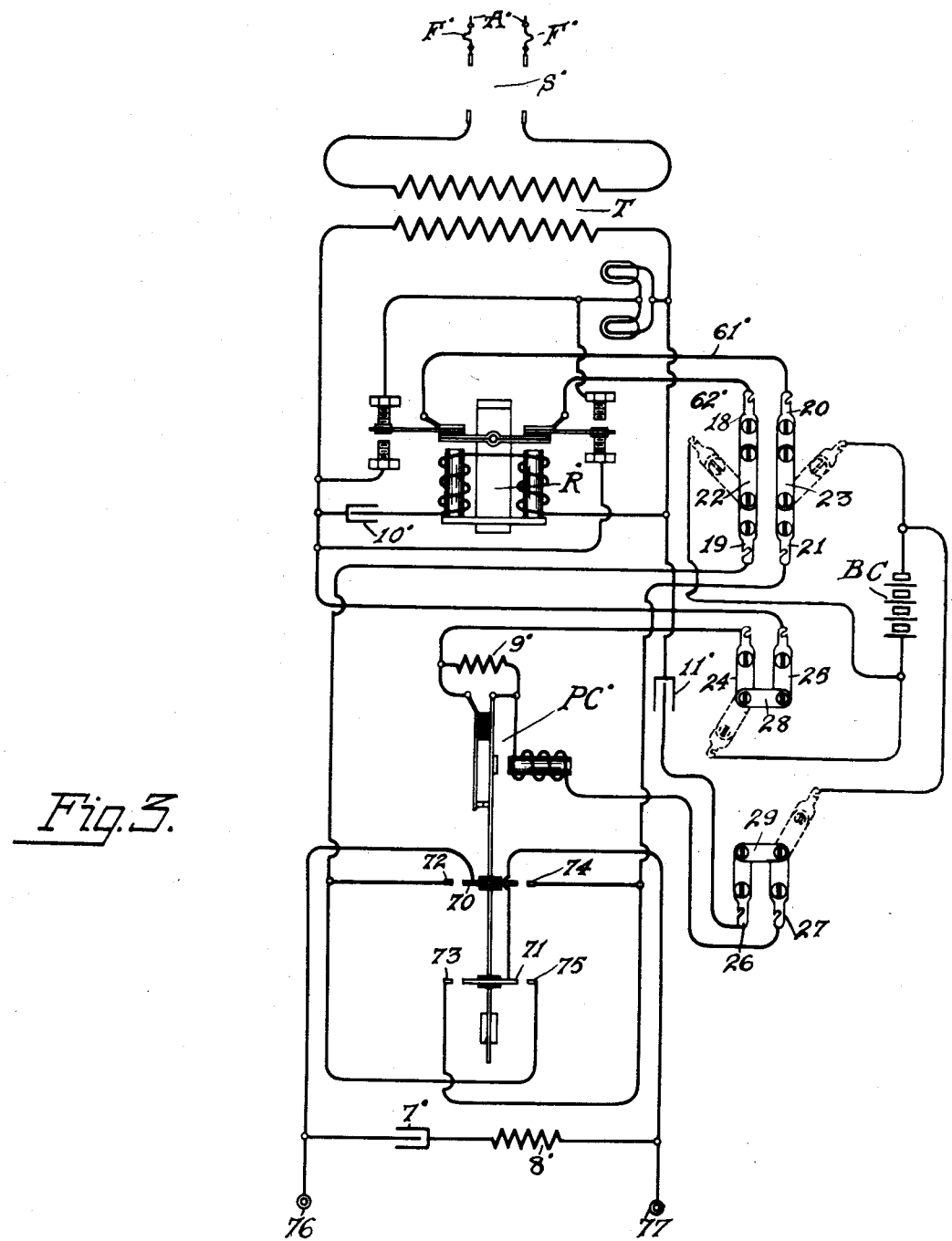
Fig. 3 is a circuit arrangement similar to that of Fig. 2, showing said device arranged to deliver alternating current only.

Condensers 10 and 11 are also fastened to the mounting board by means of suitable metal straps, which straps are suitably fastened to the board by means of screws. The condenser 10 is operatively associated with the magnets of the rectifier relay R, and the condenser 11 is associated with the pole changer PC. Terminals 13, 14, 15 and 16 are provided for connecting purposes and are suitably mounted upon the board 2 by means of the screws. To facilitate the connecting of an auxiliary supply of current to the pole changer, should the main source of supply give out, I provide two pairs of terminals 18 and 19, and 20 and 21, the terminals 18 and 19 being connected by means of a conducting strip 22, and the terminals 20 and 21 being also connected by means of a conducting strip 23. Terminals 24 and 25, and 26 and 27, are also provided, the said terminals 24 and 25 being connected by means of a conducting strip 28, and the terminals 26 and 27 being connected by means of a conducting strip 29. These terminals are also mounted upon the mounting board 2 by means of suitable screws. The terminals as illustrated in Figs. 1, 2 and 3 show the apparatus connected so as to be operated by means of a main source of power, such as a lighting circuit which is of the usual alternating current of 110 volts, having a frequency of 60 cycles. A hinged cover 30 encloses the rectifier relay R and pole changer PC to protect the same from dust. The rectifier R may be of the type disclosed in my co-pending application, Serial No. 215,454, filed February 5, 1918.

Referring now to Fig. 2, I illustrate diagrammatically the double-pole-single-throw switch S, and fuses F. The transformer T has a primary winding 31 connected across the source of alternating current, and the secondary winding 32 being connected to the apparatus. The rectifier relay R receives current induced into the secondary winding 32 from the primary winding 31 of the transformer T and rectifies or converts this current into uni-directional current. The relay R is provided with a pair of operating magnets 33 and 34, which are connected across the source of alternating current. The relay R is provided with an armature 35, which armature 35 carries a pair of insulatingly mounted contacts 36 and 37, which contacts 36 and 37 co-operate with the stationary contacts 38, 39, 40 and 41. The contact 36 alternately contacts with the stationary contacts 38 and 40, and spring 37 alternately contacts with contacts 39 and 41, due to the operation of the armature 35 which operates in synchronism with the reversals or alternations of the main source of alternating current. As is well known, the impedance of the magnets of the relay R causes a lag in the current that passes through the magnets 33 and 34, causing a lag in the operation of its armature 35, placing it under step to a certain degree with reversals of the alternating current. To overcome this, I have inserted a condenser 10 in circuit with the relay magnets 33 and 34, thereby causing the armature 35 of the relay R to operate in synchronism with the alternating current.

The lamps 43 and 44 are placed in multiple and serve as a balance so as to equalize the load. The pole changer PC as illustrated comprises a tuned reed or pendulum 45 provided with a weighted member 46 adapted to be adjusted so that the frequency of the vibrating reed 45 may be readily varied. Attached to the reed 45 is a movable contact 47 which operates to include a high resistance winding 9 in the operating circuit of the vibrator magnet 48 to decrease the current flow through said magnet 48 sufficiently to permit it to de-energize and again close the contact 47 to cause said magnet 48 to again energize. The magnet 48 provides power to keep the tuned reed 45 oscillating at a predetermined frequency so long as the local operating circuit is closed. The magnet 48 is bridged across the source of alternating current through the secondary winding 32 of the transformer T by means of the terminals 24, 25, 26 and 27, and the conducting strips 28 and 29. Insulatingly attached to the reed 45 are three movable contacts 49, 50 and 51 which co-operate with the stationary contacts 52, 53, 54, 55, 56 and 57 respectively. A condenser 7 and resistance 8 are bridged across the terminals 13 and 16 of the source of ringing current to reduce the spark at the contacts of the pole changer. The pole changer receives the uni-directional current to again change it to alternating current, which alternating current is delivered to the terminals 13 and 16. The pole changer also delivers pulsating current of opposite polarities to the terminals 14 and 15. The terminal 13 may be connected to ground and in this event the alternating source of current will be taken off of terminal posts 13 and 16 and the positive source of pulsating current will be taken off of terminals 13 and 14 or 15 and the negative source of pulsating current will be taken off of terminals 13 and 15 or 14. The electrical rectifier and pole changer as illustrated diagrammatically in Fig. 3 is constructed of apparatus similar to that described in connection with Fig. 2 and a description of the apparatus thereof is deemed unnecessary.

Having described in general the apparatus embodied in my invention, I will now describe in detail its operation. Referring to Fig. 2, and assuming that the switch S is closed, a local operating circuit is closed through the primary winding 31 of the transformer T. The current flowing through the primary winding induces a current in the secondary winding of the transformer T. The induced current flows through a local operating circuit including the magnets 33 and 34 of the rectifier relay R, thereby operating the armature 35 of said relay. The said armature vibrates in synchronism with the alternations or reversals of the alternating current connected to the conductors A. Assuming that an impulse of current of one polarity is traversing the winding 31 of the transformer T in one direction from left to right, and the armature 35 of the rectifier relay R is in the position shown in the drawings, an impulse of current will be induced in the secondary winding of the transformer T in the opposite direction from right to left in the regular manner. When the current reverses through the primary winding, the current is also reversed in the secondary winding and the rectifier relay R is operated to its alternate position. The contact 36 of the rectifier relay R operates to always supply the conductor 61 with current impulses of one polarity, while the contact 37 operates to always supply the conductor 62 with impulses of an opposite polarity. This operation is well understood and will not be further described. At the same time that the switch S bridges the source of alternating current across the primary winding 31 of the transformer T, and the said current is induced in the secondary winding 32 of the transformer through the magnets 33 and 34 of the rectifier relay R, the current is also sent through the operating magnet 48 of the pole changer, over conductor 58, terminal 25, conducting strip 28, terminal 24, conductor 59, closed contacts 47, through the winding of the said magnet 48, terminal 27, conducting strip 29, terminal 26, conductor 60, condenser 11, back to the winding 32 of the transformer. The magnet 48 energizes and attracts the reed 45, and the attraction of the said reed opens the normally closed contacts 47 and connects in series with the magnet 48, the high resistance 9, thereby diminishing the current flow through the magnet 48, and causing it to release the reed 45, thereby allowing the said reed to swing back into its normal position to again close contacts 47, thus shunting out the high resistance 9 and again allowing sufficient current to flow through the magnet 48 to again energize it, causing the said magnet 48 to vibrate the tuned reed 45 at a predetermined frequency.

The vibration of the armature of the relay R changes the delivered alternating current into uni-directional current, connecting the said uni-directional current to the conductors 61 and 62. Assuming that the magnet has drawn the reed 45 to the right until contacts 49, 50 and 51 engage stationary contacts 55, 56 and 57, respectively, current of one polarity will be delivered over the conductor 62, through terminal 18, conducting strip 22, terminal 19, conductor 63, the closed contacts 57 and 51, and conductor 64 to the terminal 16. Current of this same polarity will also pass through closed contacts 50 and 56, and over conductor 65 to the terminal 15. Current of the opposite polarity will be delivered to the terminal 13 over a circuit traced from conductor 61, through the terminal 20, conducting strip 23, terminal 21, conductor 66, closed contacts 55 and 49, and over conductor 67 to the terminal 13. Now assuming that the reed 45 has moved to its alternate position to close contacts 49 and 52, 50 and 53, 51 and 54, current of a polarity opposite to that which went to the terminal 16 at the time that the reed 45 was in its prior position will be transmitted to the terminal 16 from conductor 61, through terminal 20, conducting strip 23, terminal 21, conductor 66, closed contacts 54 and 51, and over conductor 64 to the terminal 16. Current also passes over the conductor 64, through the closed contacts 50 and 53, and over conductor 68 to the terminal 14. Likewise, current of a polarity opposite to that transmitted when the reed 45 was in its prior position will be transmitted to the terminal 13 from conductor 62, through terminal 18, conducting strip 22, terminal 19, conductor 63, conductor 69, closed contacts 52 and 49, and over the conductor 67 to the terminal 13.

From the above description, it may be seen that impulses of opposite polarity are furnished to the terminals 13 and 16 of a desired frequency for actuating telephone bells or other electro-mechanical devices, and to the terminals 14 and 15 pulsating current of opposite polarity is delivered.

In Fig. 3, I illustrate an electrical rectifier R', and pole changer PC', similar to that of Fig. 2, but the pole changer PC' is only provided with two vibrating contacts 70 and 71, and four stationary contacts 72, 73, 74 and 75, and therefore the pole changer in receiving the uni-directional current from conductors 61' and 62' changes the said uni-directional current to alternating current of a desired frequency at the terminals 76 and 77 of a frequency different than that of the alternating current delivered at the conductors A'. The operation of the rectifier relay R' and the pole changer PC' are similar to that described in detail in connection with Fig. 2, and a detailed description is not deemed necessary.

Should the main power supply which is supplied through the switch S give out for any reason, I provide the terminals 18 and 19, 20 and 21, and conducting strips 22 and 23, to which auxiliary power may be connected. Assuming that the main power gives out and an auxiliary source of current such as a storage battery or a set of dry cells is to be used for ringing the call bells of the substation, the conducting strips 22 and 23 are disconnected from the terminals 19 and 21, as shown in Fig. 2. The auxiliary source of battery current BC, which is also shown in Fig. 2, is then connected to the terminals 19 and 21, thus connecting the source of current BC to the pole changer contacts by conductors 63 and 66. To connect this auxiliary source of current to the magnet 48 of the pole changer, the conducting strips 28 and 29 are disconnected from the terminals 27 and 24, and the auxiliary source of current is connected to the terminals 27 and 24. A circuit is thus closed for the magnet 48, which may be traced from battery through the terminal 27, through the winding 48, closed contacts 47, magnet 48, conductor 59, and terminal 24 to the other side of battery. The magnet 48 energizing attracts the tuned reed 45, which opens contact 47 to connect the high resistance 9 to bring about the de-energization of the magnet 48, as previously described. The pole changer operates in the manner previously described to supply alternating current of the desired frequency to the terminals 13 and 16, and pulsating current to the terminals 14 and 15. The terminals for connecting the auxiliary source of current for operating the pole changer PC' are also shown in connection with Fig. 3, and the said auxiliary source of current is connected to the terminals in a manner similar to that described in connection with Fig. 2. The connecting strips 22 and 23 when disconnected from terminals 18 and 20 disassociate the rectifier relay R and transformer T from the pole changer PC, and the disconnection of strips 28 and 29 from terminals 25 and 29 disconnects the operating magnet 48 from the main power source so that when the main power source again starts, during the time that the apparatus is connected to the auxiliary current the apparatus being used will not be affected thereby.

From the foregoing, it will be seen that I have provided a very simple yet efficient combined rectifier and pole changer for use in converting alternating current of one frequency into alternating current of another frequency, and into pulsating current suitable for ringing telephone bells. I have also provided a simple means by which an auxiliary source of power may be connected to the apparatus in the event that the main source of power gives out.

While I have shown one specific arrangement, yet it is to be understood that I do not wish to limit myself to the same as changes and modifications will readily suggest themselves to one skilled in the art, and I, therefore, aim to cover all such changes and modifications which come within the spirit and scope of the appended claims.

What I claim as new and desire to secure by United States Letters Patent is:

1. A system of the character described including a source of alternating current, a vibratory rectifier provided with operating magnets and with movable and stationary contacts, the operating magnets of said rectifier and the stationary contacts of the same being inductively connected to said source of alternating current, a pole changer provided with an operating magnet and also having movable and stationary contacts, the stationary contacts of said pole changer being connected to the movable contacts of said rectifier, and the operating magnet of the pole changer being inductively connected to said source of alternating current, a source of uni-directional current, switching means for disconnecting the stationary contacts of said pole changer from the movable contacts of said rectifier and for connecting the stationary contacts of said pole changer to said source of uni-directional current, and a switching device for disconnecting the operating magnet of the pole changer from said source of alternating current and for connecting it to said source of uni-directional current.

2. A current changing system of the character described including a source of alternating current, a current rectifier provided with an operating magnet and having movable and stationary contacts, a transformer having one of its windings connected to said source of alternating current and its other winding connected to the stationary contacts of said rectifier and to the operating magnet of said rectifier, a pole changer provided with an operating magnet and having stationary contacts, the stationary contacts of said pole changer being connected through a switching device to the movable contacts of said rectifier, the operating magnet of said pole changer being connected through a switching device to the second winding of said transformer, and a source of uni-directional current, said switching device being operable to disconnect the stationary contacts of said pole changer from the movable contacts of said rectifier, and to connect said stationary contacts to said source of uni-directional current, and also operable to disconnect the operating magnet of said pole changer from the second winding of said transformer and to connect said operating magnet to said source of uni-directional current.

3. A circuit changing system of the character described including a source of alternating current, a vibratory current rectifier including a motor device and movable and relatively stationary contacts, a pole-changer including a motor device and movable and relatively stationary contacts, a transformer having its primary winding connected across said source of alternating current and its secondary winding normally connected in circuit with the motor devices of said rectifier and pole-changer, circuit changing contacts in the circuit of the motor device of the pole-changer, circuit conductors connecting the relatively stationary contacts of the rectifier to the secondary winding of the transformer, other circuit conductors connecting the movable contacts of the rectifier to the stationary contacts of the pole-changer, other conductors connecting the vibratory contacts of the pole-changer to the supply circuit which feeds alternating current of a frequency different than the frequency of the said source of alternating current, a source of direct current and switching contacts for switching the stationary contacts of the pole-changer from the movable contacts of the rectifier to the source of direct current and for switching the circuit of the motor device of the pole-changer from the secondary winding of the transformer to the source of direct current so that the pole-changer will operate to supply alternating current when the source of alternating current fails and the switches are operated to associate the pole-changer with the source of direct current.

4. A system of the character described including a source of alternating current, a transformer having one of its windings connected to said source of current, a supply circuit, a pole-changer including a motor device and switching contacts, a vibratory rectifier including a motor device and contacts for supplying rectified uni-directional current to the switching contacts of the pole-changer, said pole-changer then changing the source of uni-directional current to a source of alternating current of a frequency different than the frequency of the source of alternating current thereby applying ringing current to the supply circuit, the motor devices of said rectifier and pole-changer connected to the secondary winding of said transformer, a source of direct current, and switching devices for disassociating the pole-changer from the rectifier and a source of alternating current when said source of alternating current fails, and for associating the pole-changer with the source of direct current so that the pole-changer may operate to continue to supply ringing current even though the source of alternating current fails.

Signed by me at Chicago, in the county of Cook and State of Illinois, this 10th day of April, 1918.

WILLIAM KAISLING.